(12) United States Patent
King

(10) Patent No.: US 6,795,653 B1
(45) Date of Patent: Sep. 21, 2004

(54) APPARATUS FOR RESHAPING OPTICAL PULSES

(75) Inventor: Jonathan P King, Epping (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/459,548

(22) Filed: Dec. 13, 1999

(51) Int. Cl.⁷ .............................................. H04B 10/00
(52) U.S. Cl. ........................ 398/81; 398/154; 398/147
(58) Field of Search ............................. 359/184, 158, 359/237, 245, 238; 398/147, 154, 81

(56) References Cited

U.S. PATENT DOCUMENTS

| | | | | |
|---|---|---|---|---|
| 5,710,649 A | * | 1/1998 | Mollenauer | ................. 359/123 |
| 5,726,789 A | * | 3/1998 | Horiuchi et al. | ........... 359/158 |
| 5,999,287 A | * | 12/1999 | Davies et al. | ............... 359/118 |
| 6,078,416 A | * | 6/2000 | Yano | ........................... 359/158 |
| 6,104,515 A | * | 8/2000 | Cao | ............................. 359/158 |
| 6,108,125 A | * | 8/2000 | Yano | ........................... 359/158 |
| 6,373,608 B1 | * | 4/2002 | Desurvire et al. | .......... 359/124 |

* cited by examiner

*Primary Examiner*—Leslie Pascal
*Assistant Examiner*—David C. Payne
(74) *Attorney, Agent, or Firm*—Barnes & Thornburg LLP

(57) ABSTRACT

An apparatus for reshaping optical pulses divides an incoming optical signal (10) into a first (14) and a second (16) path. The signal in the second path (16) is converted into an electrical signal which provides information concerning the pulse power of individual pulses. An optical modulator (22) is provided in the first, purely optical path (14) for modifying the optical signal so as to attenuate the pulses by an amount which depends on the power of the pulses, higher power pulses being attenuated more than lower power pulses. This helps maintain a constant signal to noise ratio within the system and can extend the number of optical spans of an optical signal before it requires full electrical regeneration.

7 Claims, 2 Drawing Sheets

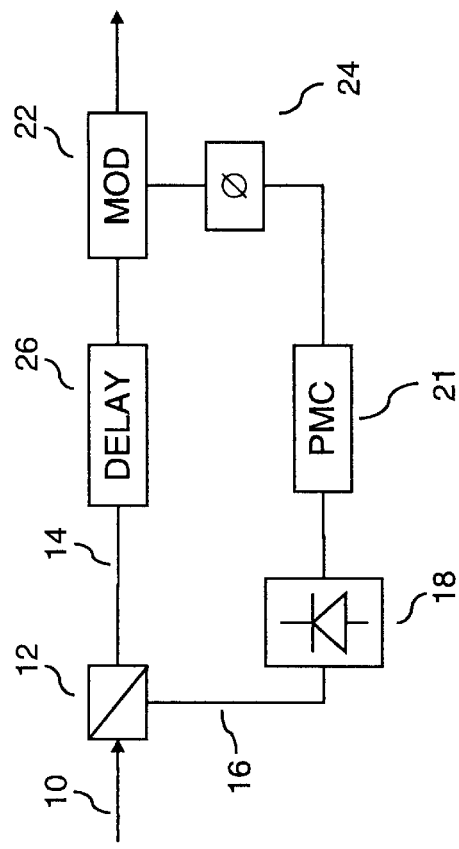
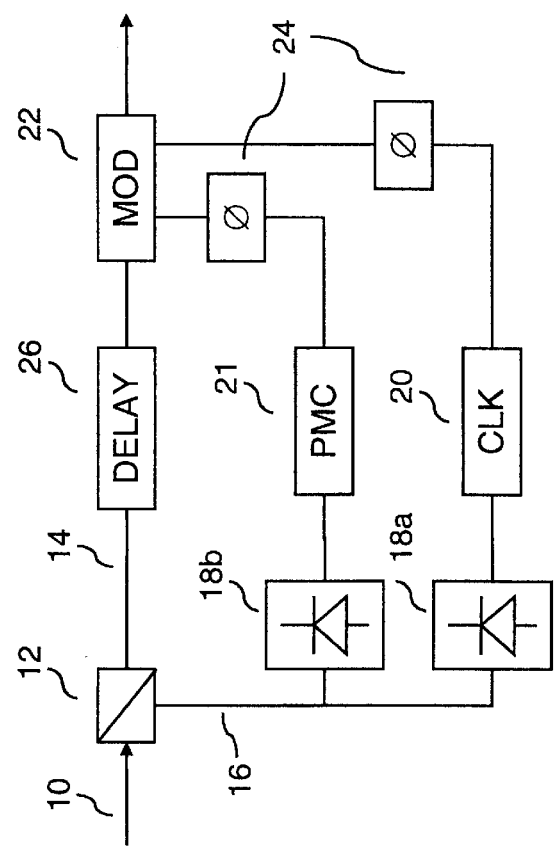
Fig. 1
Fig. 2

APPARATUS FOR RESHAPING OPTICAL PULSES

FIELD OF THE INVENTION

This invention relates to the field of optical fibre telecommunications, and more particularly to telecommunications over long distances. The invention is particularly concerned with optical communication systems using return-to-zero (R-Z) pulses, and the problems associated with distortion in the pulse shapes over long distances.

BACKGROUND OF THE INVENTION

It is known that a "soliton" type signal can be propagated along a dispersive fibre without significant chromatic dispersion, because the dependence of the refractive index on the intensity of the signal is able to oppose chromatic dispersion. Thus, the spectral form of the signal is preserved over distance.

There are, however, numerous other distortions which arise during the transmission of optical pulses. These can lead to timing jitter or amplitude noise.

It has been recognised that it is desirable to constrain timing jitter and amplitude noise without the need for full signal regeneration so that the distance between regenerators can be increased. One known approach for improving timing control involves the use of a synchronous modulator which truncates the rise and fall edges of the optical pulses. Appropriate control of a modulator in this way can also reduce amplitude noise at the same time. For example, a pulse having increased amplitude as a result of amplitude noise will, after passage through the timing control modulator, have larger bandwidth than pulses of lower amplitude. The fibre non-linearity gives rise to increased filtering of higher bandwidth signals, thereby bringing down the amplitude. Thus, it has been appreciated that the use of timing control may combine with the non-linear characteristics of the optical fibre in such a way that the optical pulses tend towards a uniform amplitude. Optical filtering elements may also be used to achieve the desired filter characteristics.

A problem with this approach is that it places constraints upon the fibre dispersion characteristics, the span lengths and the power budgets for the signals. All of these considerations need to be taken into account to enable a system to be designed which achieves the desired control of the pulse shape. This approach is not suitable for low power systems, such as WDM optical transmission systems.

SUMMARY OF THE INVENTION

According to the present invention there is provided an apparatus for reshaping optical pulses comprising:
  an input for receiving an optical pulse train;
  a divider for dividing the incoming optical signal into a first and a second path;
  a converter in the second path for converting the signal into an electrical signal, the electrical signal providing information concerning the pulse power of individual pulses;
  an optical modulator provided in the first path for modifying the optical signal in the first path, the modulator being controlled by a signal derived from the electrical signal so as to attenuate the pulses by an amount which depends on the power of the pulses, higher power pulses being attenuated more than lower power pulses.

In the arrangement of the invention, higher power pulses are attenuated more than lower power pulses, which tends to even out pulse powers to a constant level. This helps maintain a constant signal to noise ratio within the system. This can extend the number of optical spans of an optical signal before it requires full electrical regeneration. The reshaping apparatus is effectively implementing a non-linear transfer function which attenuates optical pulses according to their power.

The converter preferably comprises a photodetector for detecting the individual pulses, and circuitry for providing a signal for controlling the modulator depending on the pulse powers.

The modulator control signal may be correctly timed by so-called dead reckoning, by which a delay element is provided either in the optical path and/or in the electrical path, selected to that the delays in the two paths are equal. This ensures that the modulator is being controlled at the correct time corresponding to the arrival of the optical pulse.

The apparatus may further comprise a clock extraction circuit for extracting a clock signal from the electrical signal, and wherein the modulator is further controlled to truncate the leading edges of early pulses and to truncate the trailing edges of late pulses. In this way, the clock extraction enables jitter control to be implemented. For a given transmission network, the reshaping apparatus of the invention can then reduce the number of regenerators required.

The optical modulator may comprise a first modulator for amplitude reshaping and a second modulator for timing reshaping, or else a single modulator may be controlled to perform both functions.

The reshaping apparatus of the invention can also improve the tolerance of the optical transmission system to optical distortion effects, such as polarisation mode dispersion and other non-linear effects.

Preferably, the clock extraction unit has a narrower bandwidth than that required for detection of the data.

The invention also provides an optical network comprising optical fibre connections between end stations, the optical fibre connections comprising spans between regenerators, at least one apparatus of the invention being provided in one or more spans. The introduction of the apparatus of the invention into the fibre network can increase the total transmission distance of the system or can reduce the number of regenerators required.

The invention also provides a method of reshaping optical pulses comprising:
  dividing an input optical pulse train into a first and a second path;
  converting the signal in the second path into an electrical signal which provides information concerning the pulse power of individual pulses;
  controlling an optical amplitude modulator provided in the first path using a signal derived from the electrical signal so as to attenuate the pulses by: an amount which depends on the power of the pulses, higher power pulses being attenuated more than lower power pulses.

Preferably, the method also involves extracting a clock signal from an input optical pulse train, and using the clock signal to reshape the leading and trailing edges of the pulses.

BRIEF DESCRIPTION OF THE DRAWINGS

Examples of the present invention will now be described in detail with reference to the accompanying drawings in which:

FIG. 1 shows a reshaping apparatus of the invention using amplitude control;

FIG. 2 shows a combined amplitude and jitter controlling reshaping apparatus of the invention;

DETAILED DESCRIPTION

Figure 3:
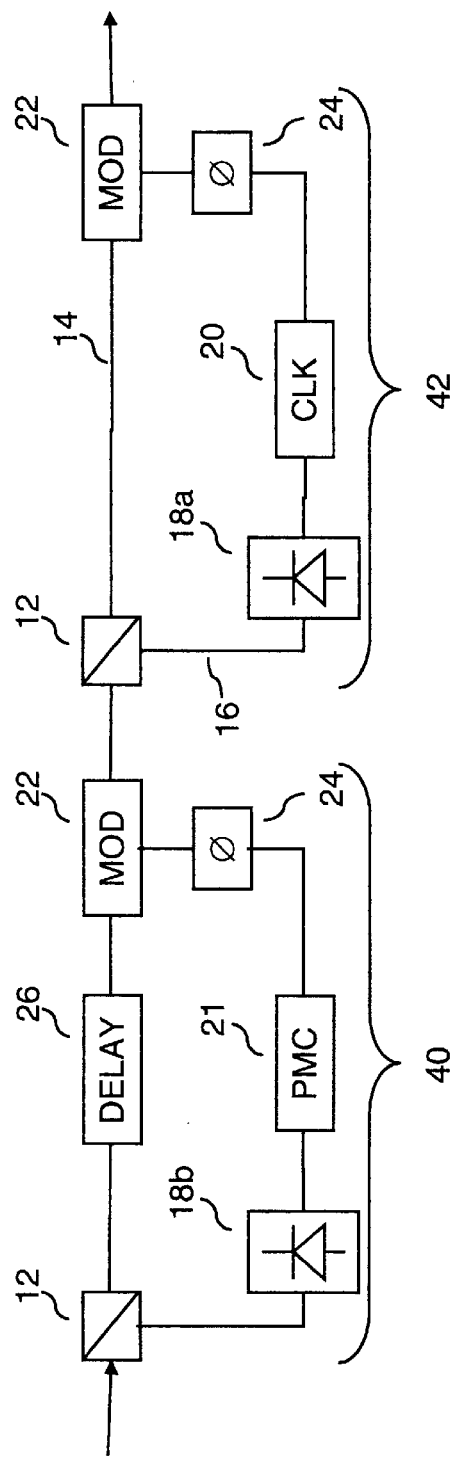
FIG. 3 shows an alternative combined amplitude and jitter controlling reshaping apparatus of the invention.

The invention provides an apparatus for reshaping optical pulses, which may be considered as implementing a partial regeneration function. Essentially, part of an incoming optical pulse stream is detected, and the resulting electrical signal is used to drive a fast optical amplitude modulator, so as to attenuate high power pulses more than low power pulses. The low power pulses may not be attenuated at all.

As shown in FIG. 1, an input signal 10 arrives through a waveguide, such as a fibre-optic cable and appropriate optics (not shown). An optical beam divider or beam splitter 12 is provided in the path of the optical signal 10 to produce two paths. A first path 14 remains in the optical domain, whereas the second path 16 is provided for enabling conversion of the signal into the electrical domain. The beam splitter 12 may cleave the signal unevenly such that the signal in the second path 16 is a low intensity signal, and the signal 14 in the first path is a high intensity signal. For example, 5% of the intensity of the incident signal 10 may be divided and passed to the second path 16.

The signal in the second path 16 is supplied to a converter 18 for converting the optical signal into an electrical signal. The electrical signal enables the power of the individual optical pulses to be detected to derive a drive signal for the amplitude controller function.

The converter 18 has sufficient resolution to provide information concerning pulse powers of individual pulses within the input signal 10. This pulse power information is obtained by pulse measurement circuitry 21, which provides a signal for controlling a modulator 22. The modulator attenuates the pulses by an amount which depends on the power of the pulses. By attenuating higher power pulses more than lower power pulses, the pulse powers tend to converge to a constant level, which helps to maintain signal to noise level.

In its simplest form, the pulse measurement circuitry 21 is a wide bandwidth amplifying chain, for example covering the bandwidth extending between 0.001 times the bit rate to at least 0.5 times the bit rate.

The modulator 22 must be controlled with a signal which is timed accurately with the arrival of the appropriate optical pulse. This may be achieved by selecting corresponding delays in the optical and electrical paths. An optical delay element 26 is provided in the optical path 14, and an electrical delay element, represented as a phasing unit 24, is provided in the electrical path 16. The phasing unit 24 allows fine tuning of the delay difference between the two paths, by controlling the phase of the electrical control signal. If there is appropriate delay control, the amplitude control system does not require extraction of a clock signal.

The control of pulse powers to maintain a substantially constant level is appropriate for the 1's of the input signal 10. However, the modulator and electronic control can be optimised to provide attenuation on the 0's as well, which further improves the signal to noise ratio by preventing noise build up in the 0's.

This can be achieved by implementing the modulator 22 as a modulator which has a non-monatomic transmission versus drive characteristic, such as an electro-absorption modulator.

The reshaping apparatus of the invention requires conversion of the input signal 10 into the electrical domain, but the optical path is not interrupted. There is no requirement to interpret the data from the input signal 10. Instead, the reshaping apparatus operates on a pulse-by-pulse basis irrespective of the data represented by the pulses. Accordingly, the electrical circuitry of the apparatus is greatly simplified in comparison to full regeneration circuitry.

FIG. 2 shows a system in which the electrical signal is also used to derive a clock signal to enable a jitter controlling function to be implemented by the modulator. For this purpose FIG. 2 shows an additional converter, so that there are two converters 18a, 18b. Two separate converters may be appropriate because the requirements of the pulse detection circuit and the clock extraction circuit are very different. A clock extraction circuit 20 receives an electrical signal from the first converter 18a and regenerates a clock signal suitable for driving the modulator.

The bandwidth response of the clock extraction circuit may be significantly lower than that of the pulse measurement circuitry 21. The bandwidth response of the pulse measurement circuitry 21 will need to be at least half the bit rate of the input signal. For example, a 40 Gb/second system will require a 20 GHz bandwidth electrical detection system.

The outputs of the pulse detection circuitry 21 and the clock extraction circuitry 20 are converted into appropriate form for control of the modulator 22 by phasing units 24.

Although in FIG. 1 separate converters 18a, 18b have been shown associated with the pulse detection circuitry and the clock extraction circuitry, these may be combined as a single converter.

A single modulator 22 is shown in FIG. 2, although separate modulators may be provided in series, one controlled by the output of the pulse measurement circuitry 21 and the other controlled by the output of the clock extraction circuitry. Similarly, the two pulse reshaping functions (amplitude modulation and jitter control) may be performed totally independently in separate, series circuits 40, 42 as shown in FIG. 3.

The jitter control circuit 42 does not require exact delay matching between the optical data path 14 and the electrical path 16 because the modulator is controlled to treat all pulses in the same way. The modulator in the jitter control circuit 42 truncates the leading edges of early pulses and truncates the trailing edges of late pulses.

Figure 4:
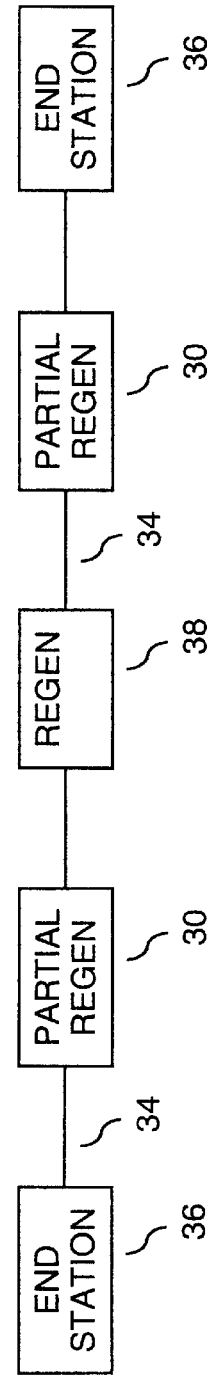
FIG. 4 shows an optical communications system using the reshaping apparatus of FIG. 1, 2 or 3.

As shown in FIG. 4, the partial regenerator 30 described above may be used in an optical network 32 having optical fibre connections 34 between end stations 36. One or more of these reshaping apparatus 30 may be provided in the spans between regenerators 38, thereby enabling the distance between full regenerators to be increased, or else enabling the full reach of the system to be increased for a given number of regenerators.

The modulator 22 may be implemented as a lithium niobate Mach-Zehnder interferometer modulator, which may be formed as a diffused strip waveguide. Alternatively, the modulator 22 may be an electro-absorption modulator, as mentioned above.

The clock extraction circuitry is conventional and will be known by those skilled in the art. It is designed to regenerate the clock frequency and the phase of the distorted signal as received. It produces an electrical tone that is substantially frequency and phase synchronised with the signal pulses.

The reshaping apparatus of the invention may be combined with a conventional optical amplifier to provide an optical reshaping and amplification stage within a communication system.

Various alternatives to the specific implementation described will be apparent to those skilled in the art. Thus, there are other ways of implementing electrical power detection of optical pulses and for modulating those pulses as a function of the optical power to implement a non-linear transfer function.

What is claimed is:

1. An apparatus for processing optical pulses comprising:

an input for receiving an optical pulse train;

a divider for dividing the incoming optical signal into a first and a second path;

a converter in the second path for converting the signal into an electrical signal, the electrical signal providing information concerning the pulse power of individual pulses;

an optical delay element provided in the first path;

an optical modulator provided in the first path downstream of the delay element for modifying the delayed optical signal in the first path, the modulator being controlled by a signal derived from the electrical signal so as to attenuate the pulses by an amount which depends on the power of the pulses, higher power pulses being attenuated more than lower power pulses, thereby to reshape the optical pulses.

2. An apparatus as claimed in claim 1 further comprising a clock extraction circuit for extracting a clock signal from the electrical signal, and wherein the modulator is further controlled to truncate the leading edges of early pulses and to truncate the trailing edges of late pulses.

3. An apparatus as claimed in claim 2, wherein the optical modulator comprises a first modulator for amplitude reshaping and a second modulator for timing reshaping.

4. An apparatus as claimed in claim 1, wherein the converter comprises a photodetector for detecting the individual pulses, and circuitry for providing a signal for controlling the modulator depending on the pulse powers.

5. An optical network comprising optical fibre connections between end stations, the optical fibre connections comprising spans between regenerators, at least one apparatus as claimed in claim 1 being provided in one or more spans.

6. A method of processing optical pulses comprising:

dividing a pulse train into a first and a second path;

converting the signal in the second path into an electrical signal which provides information concerning the pulse power of individual pulses;

delaying the optical signal in the first path;

controlling an optical amplitude modulator provided in the first path using a signal derived from the electrical signal so as to attenuate the pulses of the delayed signal by an amount which depends on the power of the pulses, higher power pulses being attenuated more than lower power pulses thereby to reshape the optical pulses.

7. A method as claimed in claim 6, further comprising extracting a clock signal from an input optical pulse train, and using the clock signal to reshape the leading and trailing edges of the pulses.

* * * * *